D. R. WOODALL, Jr.
FERTILIZER DISTRIBUTER.
APPLICATION FILED APR. 4, 1912.
1,053,463.
Patented Feb. 18, 1913.
3 SHEETS—SHEET 1.
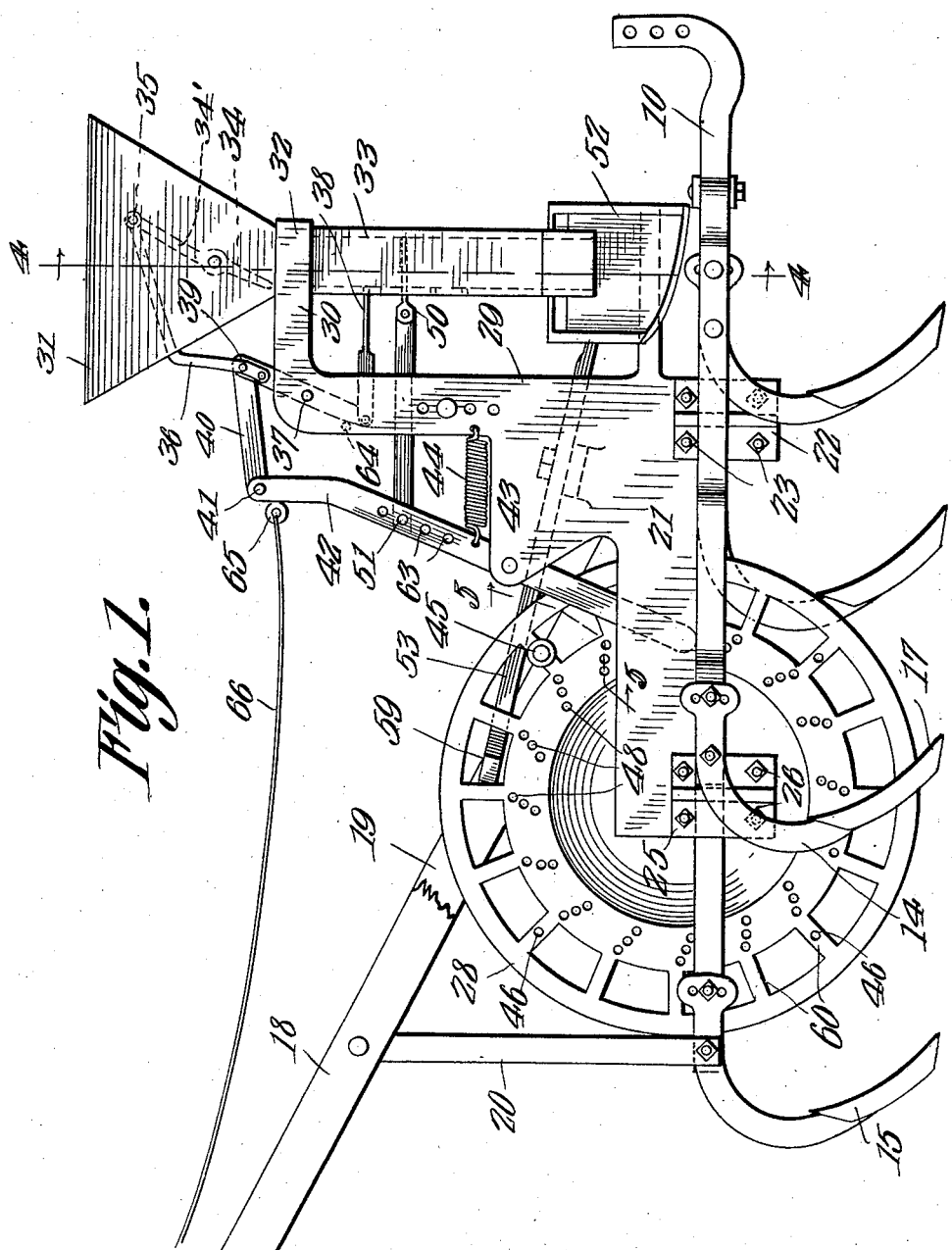

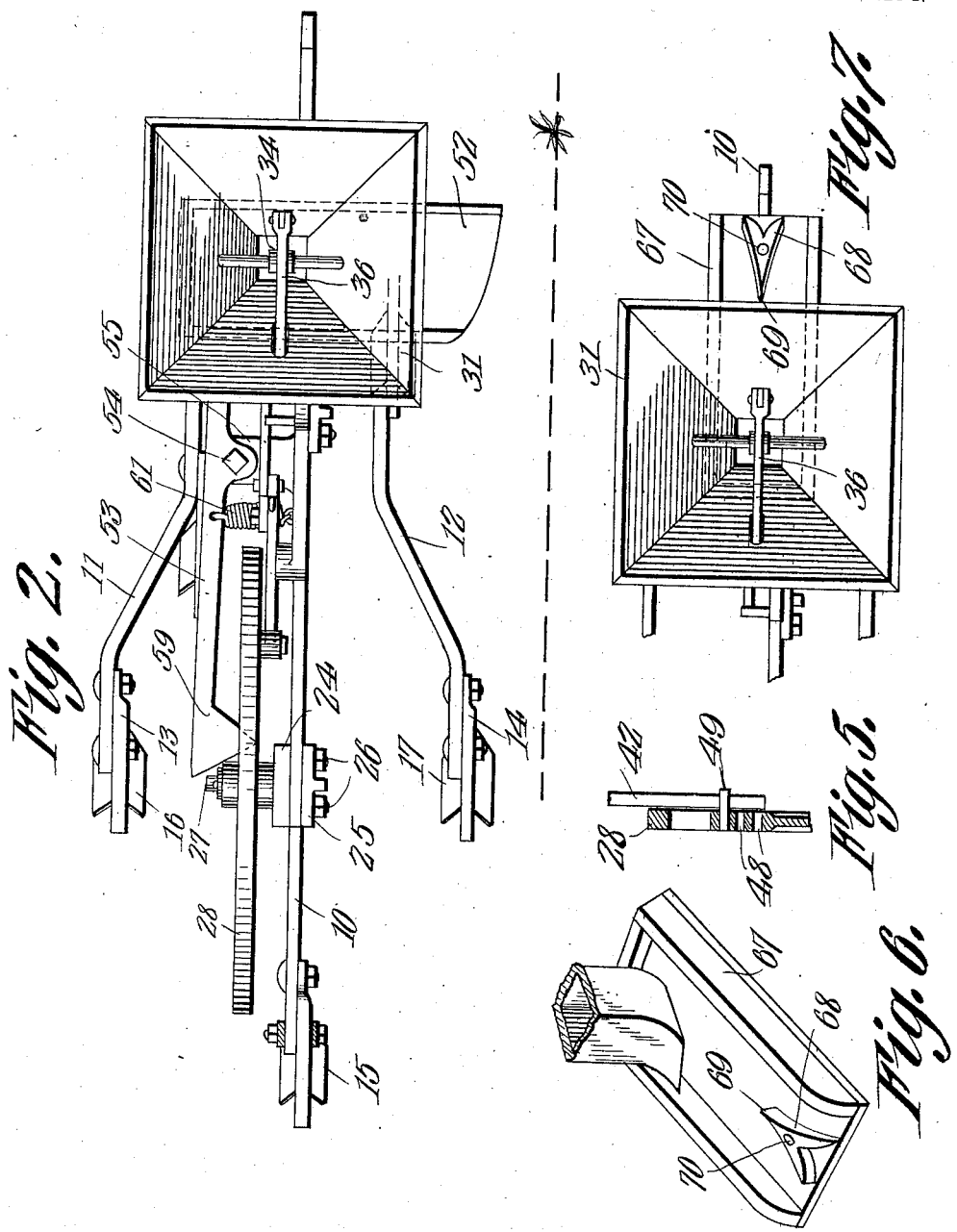

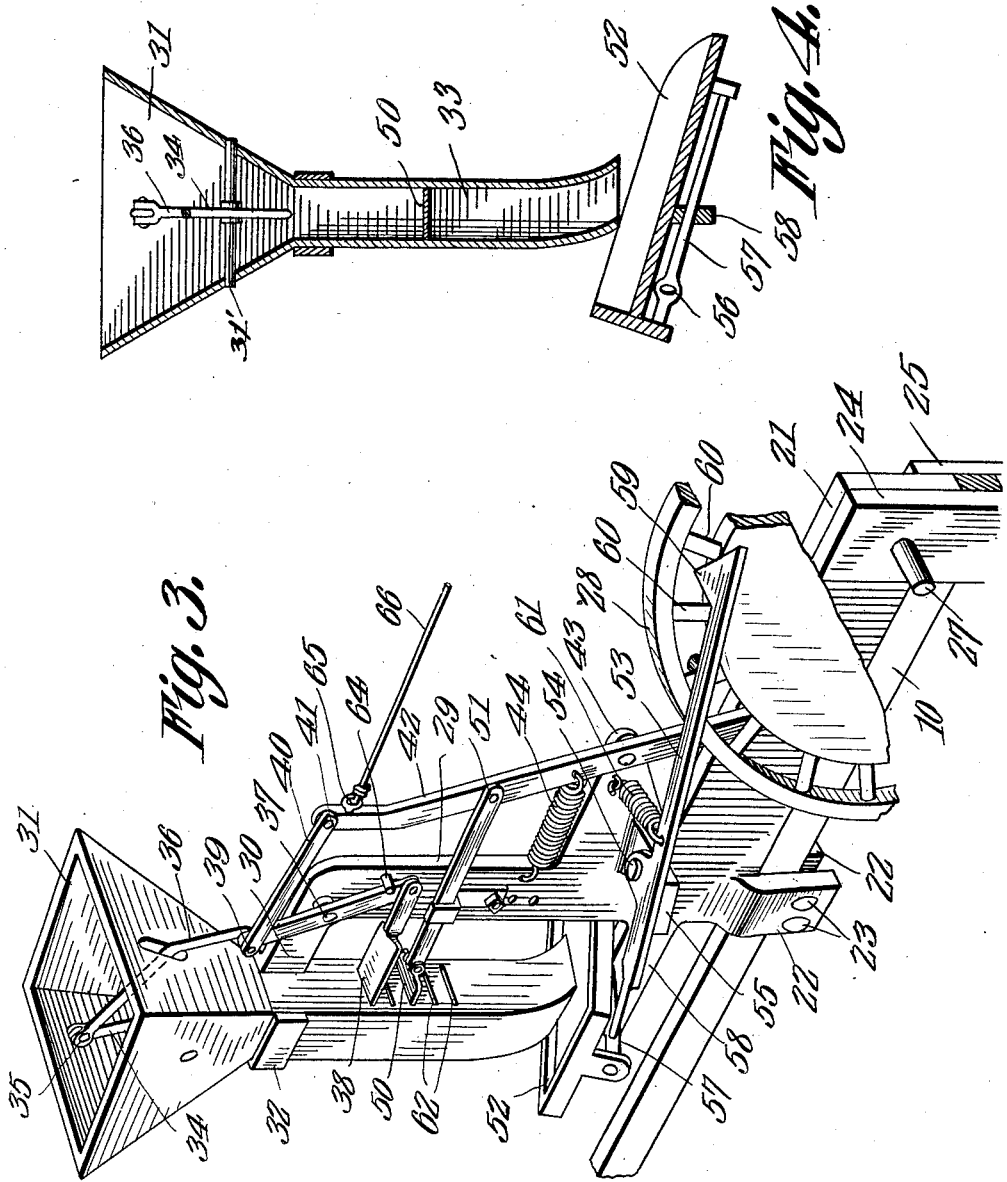

UNITED STATES PATENT OFFICE.

DANIEL R. WOODALL, JR., OF CHESTERTOWN, MARYLAND, ASSIGNOR OF ONE-HALF TO ROBERT G. NICHOLSON, OF CHESTERTOWN, MARYLAND.

FERTILIZER-DISTRIBUTER.

1,053,463.  Specification of Letters Patent.  Patented Feb. 18, 1913.

Application filed April 4, 1912. Serial No. 688,403.

*To all whom it may concern:*

Be it known that I, DANIEL R. WOODALL, Jr., a citizen of the United States, residing at Chestertown, in the county of Kent and State of Maryland, have invented certain new and useful Improvements in Fertilizer-Distributers, of which the following is a specification.

My invention relates to fertilizer distributers for attachment to cultivators.

The primary object of the invention is to provide an improved fertilizer distributer especially adapted for attachment to cultivators of that class known as "hand cultivators."

Another object of the invention is to provide an improved fertilizer distributer for attachment to a cultivator whereby fertilizer may be distributed laterally to each hill from the cultivator running between the hills or over the adjacent hill.

Another object of the invention is to provide an improved fertilizer distributer for attachment to a cultivator whereby fertilizer may be distributed rearwardly upon the hill, from the cultivator running over the hill.

Another object of the invention is to provide an improved fertilizer distributer from which the fertilizer may be distributed in one or two streams and deflected to either side as may be desired.

Another object of the invention is to generally improve fertilizer distributers for attachment to cultivators with a view to easy and quick attachment to or removal from the cultivator, simplicity, economy, and strength in the construction of the several parts, ready adjustment of the several parts and their quick and easy removal from or replacement upon the cultivator.

With these, and other objects which may hereinafter appear, in view, the invention consists in the improved construction, arrangement and combination of the parts of a fertilizer distributer, which will be hereinafter fully described and afterward specifically claimed.

In order that the construction and operation of the various parts comprised in my invention may be readily comprehended by those familiar with such machinery, I will now proceed to specifically describe a preferred embodiment of the invention which is illustrated in detail in the accompanying drawings, in which—

Figure 1 represents a view in side elevation of the fertilizer distributer applied to a cultivator, and equipped to distribute the fertilizer laterally, the cultivator handle being broken away. Fig. 2 represents a plan view of the same, parts of the cultivator being omitted. Fig. 3 represents a perspective view of the distributing mechanism mounted on a main central beam of a cultivator, all of the other cultivator parts being omitted. Fig. 4 represents a vertical transverse sectional view of the hopper of the distributer taken on the plane indicated by the broken line 4—4 of Fig. 1. Fig. 5 represents a detail sectional view taken on the plane indicated by the broken line 5—5 of Fig. 1 illustrating a modification which may be employed. Fig. 6 represents a detail perspective view illustrating a modified form of distributing chute for the distributer, and Fig. 7 represents a plan view of the hopper having the modified form of chute illustrated in Fig. 6, showing an adjustable button or deflector whereby the discharge may be separated, applied thereto.

Like reference characters mark the same parts wherever they occur in the several figures of the drawings.

Referring specifically to the drawing, 10 indicates the main central beam of a cultivator of the class known as "hand cultivators" from which projects on each side a horizontal beam as at 11 and 12, to each of which beams is secured a side beam as at 13 and 14, a cultivator tooth, as at 15, 16 and 17 being secured to each beam 10, 13 and 14 in any usual or well known manner. Handles 18 and 19 are secured to the cultivator frame and are suitably stiffened by braces as at 20. All of these parts are constructed and secured together in any usual or approved manner and form no part of the present invention, such parts being changeable and adjustable at will and serving only as supports or carriers of my improved fertilizer distributer now to be described.

In Fig. 3 I have illustrated as a whole, my fertilizer distributer attachment, said attachment comprising a main plate 21 which rests upon the top of the main beam 10 from which plate depend, at its forward end, brackets or clips 22 which straddle the main beam 10 and are secured by bolts 23. At the rear end of the plate 21 is a depending bracket plate 24 on one side of the main plate and beam 10, and on the opposite side of the plate and beam is a bracket 25, the two brackets 24 and 25 being secured together and upon the plate and beam 10 by means of bolts 26.

From the bracket 24 projects laterally a spindle 27 upon which is journaled a wheel 28 which, besides resting upon the ground and supporting the whole structure so as to prevent the cultivator teeth from projecting too deeply into the earth, has other functions to be described hereinafter.

The plate 21 is extended upward, near its forward end, forming a vertical arm 29 from the upper end of which extends forwardly a horizontal arm 30 which supports a hopper 31, said arm being bent around at 32 to embrace the spout 33 of said hopper, which spout depends downwardly, in the vertical plane of the plate 21 and beam 10.

Within the hopper 31 mounted on a transverse pivot 31' to swing in a fore and aft vertical plane, is an agitator or stirrer 34, above which pivot the stirrer has an extension or arm 34' which is pivotally connected at its upper end, at 35, with an arm 36 pivoted at 37 to the vertical arm 29 of the plate 21. Below its pivot, the arm 36 is pivotally connected with a valve 38 which is slidable horizontally and transversely in the spout 33 of the hopper.

The arm 36, above its pivot, 37 is pivotally connected at 39 with a link 40 which at its opposite end, at 41, is pivotally connected to the upper end of a lever 42 pivoted to an extension 43 of the plate 21 and having its upper end normally held yieldingly in a forward position by means of a spring 44 which connects it with the vertical arm 29 of the plate 10.

The lever 42 is of the first order and has its lower ends normally held yieldingly in the path of a pin 45 projecting laterally from the wheel 28. There may be one, or a plurality of pins 45 in the wheel 28, holes 46 being provided at intervals in the wheel, whereby two adjustments are provided, to wit; an adjustment of a single pin in any one of the holes 46 whereby the time during each revolution when the pin will operate the lever 42 is determined, and an adjustment, by placing one, two, or more pins in position in the holes 46 whereby the lever 42 may be operated once, twice, or more times during each revolution of the wheel.

In Figs. 1 and 5 I have shown means, comprising series of holes 48 at varying distances from the center of revolution of the wheel, into which one or a plurality of pins 49 may be placed, whereby both of the adjustments hereinbefore described may be effected, and, in addition thereto, the extent of throw of the lever 42 may be varied by adjusting the pins 49 nearer to or farther from the center of revolution of the wheel.

A valve 50 is mounted to slide horizontally and transversely in the spout 33 of the hopper, below the valve 38, and is connected pivotally at 51 to the lever 42 above the pivot of the lever. By virtue of the indirect connection of the valve 38 with the lever 42 and the direct connection of the valve 50 therewith, when the lever is held in its normal position by the spring 44, the valve 38 will be in its withdrawn or open position, and the valve 50 in its forward or closed position, as shown in Fig. 1, and when the lever 42 is rocked on its pivot by the contact with the pins on the wheel, connection with the spring 44, both valves will be simultaneously moved, one forward, and the other backward, or one to its open position and the other to its closed position. For this reason, when the wheel is rotated by drawing the cultivator forward, the valves 38 and 50 will be thus simultaneously moved in opposite directions and consecutive charges of fertilizer, each filling the space between the two valves, will be discharged from the hopper through the spout into a chute 52 suspended below the lower end of the spout and, in the embodiment shown in Fig. 1, arranged to discharge the fertilizer dropped thereon laterally to one side of the track of the cultivator teeth.

A lever 53 is pivotally mounted to rock horizontally on a vertical pin 54 erected on a bracket 55 secured to the plate 21. The forward end of the lever enters an opening 56 in a rod 57 secured transversely to the chute 52 and slidable in the arm 58 while the rear end of this lever 53 has a saw tooth cam 59 projecting laterally therefrom and normally held between, or in the path of the spokes 60 of the wheel 28 by means of a spring 61 connecting the lever with the plate 21. By virtue of this construction, as the wheel rotates and the consecutive charges of fertilizer are dropped on the chute, the spokes 60 and spring 61 acting in opposite directions on the lever and tooth, will rock the lever on its pivot, and horizontally agitate the chute, thus securing the regular and full discharge of the fertilizer therefrom.

In order to vary the amount of fertilizer in each charge discharged through the spout upon the chute, a plurality of slots 62 are cut in the spout in which to slide the valve 50 and in order that the said valve may slide freely in such slots, a series of holes 63 are provided in lever 42 in which to engage the pivotal connection between the valve and said lever to correspond with the height of the slot in the spout in which the valve 50 is adjusted to slide.

A stop 64 in the vertical arm 29 of plate 21 is provided to prevent the spring from moving and normally holding the lever 42 and arm 36 too far forwardly, whereby the valves might be drawn entirely out of their slots in the spout, or the stirrer broken in the hopper.

In the edge of the lever 42 is an eye-bolt 65 in which to engage a cord 66 extending rearwardly to one of the handles of the cultivator, whereby the lever 42, and its connections comprising the agitator and valves, may, in connection with the spring, be manually actuated to shake down anything which may lodge in the hopper or chute.

In Figs. 6 and 7 I have shown a modified form of chute at 67, located below the lower or discharge end of the hopper spout but attached in such a manner as to bring its discharge end to the front, instead of to the side, as in the construction heretofore described. With this arrangement, the fertilizer will be discharged in the line of travel of the cultivator teeth and in front thereof, whereby the fertilizer will be covered up by the teeth following it. In these figures I have shown a button or deflector 68 secured to the floor of the chute 67, said button being of substantially V shape with its apex, as at 69, at the rear whereby the fertilizer discharged from the chute may, by adjusting the button on its connecting pin or screw 70, be discharged in one stream from either side of the discharge end of the chute, or in two streams from the two sides of the discharge end of the chute, intermediate adjustments serving to vary the amount discharged in each stream.

From the foregoing description, in connection with the drawings, a clear understanding of the exact construction, arrangement and operation of the several parts of the illustrated embodiment of my invention may be readily had, but I desire it to be understood that changes and variations from such exact constructions may be made without departing from the spirit and scope of the invention.

Having thus fully described my invention, what I claim as new, and desire to secure by Letters Patent of the United States, is:—

1. A device of the character described, comprising a cultivator provided with a main beam, and a fertilizer distributer comprising a vertical plate mounted upon and in the vertical plane of said beam, a hopper and spout mounted upon said plate, an agitator in said hopper, valves in said spout, a supporting wheel, and a single means operated by said wheel for operating said agitator and said valves simultaneously in opposite directions.

2. A device of the character described, comprising a cultivator provided with a main beam and a fertilizer distributer comprising a plate mounted upon said beam, a hopper and spout mounted upon said plate, an agitator in said hopper, valves in said spout, a single means operated by said wheel for operating said agitator and valves, and slots and holes in said spout and lever respectively for adjusting one of said valves.

3. A device of the character described comprising a cultivator provided with a main beam, and a fertilizer distributer comprising a main vertical plate mounted upon and in the vertical plane of the beam, a hopper and spout mounted on the plate, an agitator in the hopper, valves in the spout, a supporting wheel, and a single means operated by said wheel for operating said agitator and valves.

4. In a fertilizer distributer, a main vertical plate provided with a vertical arm having a horizontal extension, a hopper and spout supported on the horizontal extension, an agitator mounted on a transverse pivot in the hopper, an arm pivoted to the vertical arm and pivotally connected to the agitator, a lever pivoted on an extension of the main plate and pivotally connected to said pivoted arm, a supporting wheel, and means upon the wheel to rock the lever and operate the agitator.

5. In a fertilizer distributer a main vertical plate provided with a vertical arm having a horizontal extension, a hopper and spout supported on the horizontal extension, an agitator mounted on a transverse pivot in the hopper, an arm pivoted to the vertical arm and pivotally connected to the agitator, a lever pivoted on an extension of the main plate and pivotally connected to said pivoted arm, a supporting wheel, means upon the wheel to rock the lever and operate the agitator, and two transverse valves in the hopper spout, one valve connected to said pivoted arm and the other to said pivoted lever.

6. In a fertilizer distributer a main vertical plate provided with a vertical arm having a horizontal extension, a hopper and spout supported on the horizontal extension, an agitator mounted on a transverse pivot in the hopper, an arm pivoted to the vertical arm and pivotally connected to the agitator, a lever pivoted on an extension of the main plate and pivotally connected to the pivoted arm, means upon the wheel to rock the lever and operate the agitator, a chute below the hopper spout, and valves in the spout operated simultaneously with and by the same means as the agitator.

7. In a fertilizer distributer, a main vertical plate provided with a vertical arm having a horizontal extension, a hopper and spout supported on the horizontal extension, an agitator mounted on a transverse pivot in the hopper, an arm pivoted to said vertical arm of said plate and pivotally connected to the agitator, a lever pivoted on an extension of the main plate and pivotally connected to said pivoted arm, a supporting wheel, means upon said wheel to rock the lever and operate the agitator, a chute below the hopper spout, a horizontally rockable lever connected to the chute, and means on the wheel operating on the lever to rock it and the chute.

8. In a fertilizer distributer, a main vertical plate provided with a vertical arm having a horizontal extension, a hopper and spout supported on said horizontal extension, an agitator mounted on a transverse pivot in said hopper, an arm pivoted to the vertical arm of said plate and pivotally connected to the agitator, a lever pivoted on an extension of the main plate and pivotally connected to said pivoted arm, a supporting wheel provided with spokes, means upon said wheel to rock the lever and operate the agitator, a chute below the hopper spout, a horizontally rockable lever connected to the chute, a saw tooth cam on the rockable lever, and a spring normally holding the cam tooth between the spokes of the wheel.

9. A fertilizer distributer comprising a main vertical plate, a hopper and spout supported thereon, a spindle on the plate, a wheel on the spindle, pins projecting laterally from said wheel, an agitator in the hopper, a lever pivoted to the plate and connected to the agitator, a spring between said lever and plate, and an extension on the lever beyond its pivot projecting in the track of the pins on the wheel.

10. A fertilizer distributer comprising a main vertical plate, a hopper and spout supported thereon, a spindle on said plate, a wheel on said spindle, pins projecting laterally from said wheel, an agitator in said hopper, a lever pivoted to the plate, an extension on the lever beyond its pivot and projecting in the track of the pins on the wheel, and valves slidable transversely in said spout one being connected directly and the other indirectly to said lever.

11. A fertilizer distributer comprising a main vertical plate, a hopper and spout supported thereon, a spindle on said plate, a wheel on said spindle, pins projecting laterally from said wheel, an agitator in said hopper, a lever pivoted to the plate and connected to the agitator, a spring between the lever and said plate, an extension on the lever beyond its pivot projecting in the track of the pins on said wheel, and a cord connected to said lever and extending to within reach of the operator to permit of manual operation of the lever.

In testimony whereof I affix my signature in presence of two witnesses.

DANIEL R. WOODALL, Jr.

Witnesses:
E. WALTON BREWINGTON,
BROWN M. ALLEN.

---

Copies of this patent may be obtained for five cents each, by addressing the "Commissioner of Patents, Washington, D. C."